US006455135B1

(12) United States Patent
Kamiyama et al.

(10) Patent No.: US 6,455,135 B1
(45) Date of Patent: Sep. 24, 2002

(54) TRANSPARENT RECORDING FILM

(75) Inventors: Koji Kamiyama, Tama (JP); Shigeaki Dohgoshi, Sagamihara (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/509,369

(22) PCT Filed: Sep. 29, 1998

(86) PCT No.: PCT/US98/20592

§ 371 (c)(1), (2), (4) Date: Mar. 24, 2000

(87) PCT Pub. No.: WO99/22274

PCT Pub. Date: May 6, 1999

(30) Foreign Application Priority Data

Oct. 28, 1997 (JP) .............................................. 9-295794

(51) Int. Cl.[7] ............................ B32B 27/14; B32B 3/00
(52) U.S. Cl. ......................... 428/195; 428/480; 428/913
(58) Field of Search ................................ 428/195, 480, 428/913

(56) References Cited

U.S. PATENT DOCUMENTS 3,854,942 A 12/1974 Akman ......................... 96/1.2
4,059,613 A * 11/1977 Nakamura et al. ............ 560/26
5,190,582 A * 3/1993 Shinozuka et al. ....... 106/20 D
5,620,821 A 4/1997 Ogura ......................... 430/42

FOREIGN PATENT DOCUMENTS

EP 0 482 923 A1 10/1991 ............ G03G/7/00
EP 0 778 500 A1 12/1996 ............ G03G/7/00

* cited by examiner

*Primary Examiner*—Cynthia H. Kelly
*Assistant Examiner*—B. Shewareged
(74) *Attorney, Agent, or Firm*—Yen Tong Florczak

(57) ABSTRACT

The present invention provides an image-recording transparent film having a toner-fixing layer which shows an improved compatibility with a toner resin, and capable of forming a color image of high quality. An image-recording transparent film comprising a transparent substrate and a toner-receiving layer provided at least on one major surface of the substrate, the toner-receiving layer comprising a light-transmitting resin having a softening point of 90 to 180° C., and from 0.1 to 40 parts by weight of an amide nonionic surfactant based on 100 parts by weight of the light-transmitting resin which surfactant is in a compatible state with the light-transmitting resin.

3 Claims, No Drawings

TRANSPARENT RECORDING FILM

DETAILED DESCRIPTION OF THE INVENTION

The present invention relates to a light-transmitting image-recording transparent film to be appropriately used in an overhead projector (referred to as OHP hereinafter), and a method for producing an image-recorded film.

Prior Art

A color image for projection by an OHP on a transparent film has recently been formed by electrophotography. In the method, a black toner and color toners are allowed to adhere to a transparent film in accordance with a desired pattern by any of the electrophotographic apparatuses provided by various manufacturers to simply give a color image or the like.

However, when the film for an OHP thus obtained by the method is actually projected, excellent reproduction of a desired sharp image cannot be obtained on a screen. When a color image is projected in particular, there is a problem that the projected image is considerably blackened and grayed compared with the color image directly observed by the naked eye. The impossibility to obtain an excellent, transparent, sharp projected image is mainly caused by the recesses and protrusions of the surface of the toner image formed on the transparent film by electrophotography. That is, since light incident on a transparent substrate supporting the image is scattered and irregularly reflected by the recesses and protrusions on the toner image surface, the amount of the transmitted light in the toner image portion is protrusions on the toner image surface, the amount of the transmitted light in the toner image portion is reduced. Consequently, the blackened and grayed image is projected.

In order to solve such problems and improve the sharpness and transparency of the projected image, several improvements in the image-recording transparent film have been proposed. For example, Kokai (Japanese Unexamined Patent Publication) No. 2-263642 discloses a transparent laminate film comprising a substrate composed of a first transparent resin and a toner-fixing layer composed of a second transparent resin and provided thereon, the second transparent resin having a solubility parameter of 9.5 to 12.5 and a storage elastic modulus (G') of 10 to 10,000 dyne/$cm^2$, and the storage elastic modulus of the toner to be fixed being smaller than the elastic modulus of the toner-fixing layer. The toner particles are flatly crushed on the fixing layer by a pressure during fixing, in such a transparent film, and the fixing layer has a good compatibility with the resin contained in the toner. The surface of the toner image can, therefore, be effectively flattened. However, when the fixing operation is conducted on these transparent films without using a releasing agent (releasant) such as a silicone oil, hot offset may occur in the step of forming an image.

On the other hand, a releasing agent such as a silicone oil which is liquid at room temperature may make the surface of the toner-receiving layer, in which an image is formed, sticky. Accordingly, the use of a toner containing wax as the releasing agent and a transparent film capable of being used with the wax-containing toner in combination is proposed. For example, Kokai (Japanese Unexamined Patent Publication) Nos. 5-181300, 6-75418, etc., disclose image-forming transparent films each having a substrate layer and a toner-fixing layer capable of absorbing a wax component. In the former patent publication, the toner-fixing layer has an absorbing layer composed of inorganic particles. In the latter patent publication, the fixing layer is composed of such a resin containing a diene component as a polybutadiene. In these films, the wax bleeding from the toner prevents hot offset during fixing, and the wax having bled from the toner is absorbed after fixing. Consequently, the wax is prevented from remaining on the image surface, whereby deterioration of the image quality caused by the wax having bled can be effectively prevented.

Problems to Be Solved by the Invention

However, the transparent film capable of being used with the wax-containing toner as mentioned above shows no significant effect of the proper toner-fixing layer (flattening the toner image, compatibilizing the toner resin, and the like), and the image quality may not be improved after all. Moreover, for a toner containing no wax, the transparent film has showed deteriorated image quality on the contrary. The deterioration of an image quality is principally caused by a low compatibility of the toner-fixing layer and the toner resin.

That is, an object of the present invention is to provide an image-recording transparent film having a toner-fixing layer with an improved compatibility with a toner resin regardless of whether wax is contained or not, and capable of forming a color image of high quality.

Means for Solving the Problems

In order to solve the problems as mentioned above, the present invention provides an image-recording transparent film comprising a transparent substrate and a toner-receiving layer provided on at least one major surface of the substrate, the toner-receiving layer comprising a light-transmitting resin having a softening point of 90 to 180° C., and from 0.1 to 40 parts by weight of an amide nonionic surfactant based on 100 parts by weight of the light-transmitting resin wherein the surfactant is in a compatible state with the light-transmitting resin.

Mode of Operation

Since the toner-receiving layer (namely a toner-fixing layer) contains the light-transmitting resin having a softening point of 90 to 180° C., toner particles subsequent to fixing sink in the interior of the toner-receiving layer. As a result, recesses and protrusions are effectively prevented from remaining on the surface of a toner image, and the sharpness and transparency of the image is improved. When the softening point is less than 90° C., there is a strong fear that hot offset may occur during fixing the toner. Conversely, when the softening point exceeds 180° C., recesses and protrusions may not be effectively prevented from remaining on the surface of the toner image.

Moreover, the amide nonionic surfactant functions as a compatibilizing agent of the resin for the toner and the light-transmitting resin of the toner-receiving layer, and enhances the compatibility of a wide range of resins. Consequently, the image quality (particularly the lightness and chroma) is effectively improved. The surfactant is contained in an amount of 0.1 to 40 parts by weight based on 100 parts by weight of the-light-transmitting resin.

Furthermore, when the wax-containing toner is used, the surfactant hinders the crystal growth of the wax having bled from the toner during fixing, and prevents the wax from becoming white due to crystallization, preventing the deterioration of the transparency of the image. The surfactant is particularly excellent in exhibiting the effect of preventing decreases in the lightness and chroma in a high color density portion caused by the wax which has become white. The surfactant sufficiently makes the wax display its proper function, namely the effect of preventing offset and a decrease in the smoothness of the image surface caused by the offset, and improves the lightness and chroma of the image.

That is, the image-recording transparent film of the present invention can form a light-transmitting image of high image quality even when a wide variety of toners are used in combination, regardless of the type of the toner resin and regardless of whether or not the wax is contained.

Embodiments

Transparent Substrate

The transparent substrate used in the present invention (merely referred to as a substrate sometimes hereinafter) can be selected from conventional polymer films having a conventional high transparency. A film from about 25 to 175 μm thick excellent in transparency, heat resistance, strength and rigidity is preferred. A preferred concrete example of the polymer is a polyethylene terephthalate. Other polymers such as a polyolefin, a polycarbonate, an acrylic polymer and a polyvinylidene fluoride may also be used.

Toner-Receiving Layer

It is preferred that the light-transmitting resin of the toner-receiving layer in the present invention be excellent in transparency, that it have a good compatibility with the resin forming the toner, and that it have a refractive index approximately equal to that of the toner-forming resin, because the use of such a resin does not hinder the light transmission of is the toner image. Moreover, the resin used in the toner-receiving layer preferably has a softening point lower than that of the toner used for forming an image. The image surface can be smoothed while the resolution of the toner image is being held, by increasing the degree of softening the toner-receiving layer more than the degree of melting (or softening) the toner, as a result of pressing under high temperature conditions in the toner-fixing operation.

Since toners which are principally used in the 2S field of electrophotography at present have a softening point of 95 to 190° C., the toner-receiving layer appropriately has a softening point of 90 to 180° C. In the present specification, the term softening point designates a temperature at which a solid resin softens in a rubber-like state, or a temperature at which the crystalline portion within the molecule melts. The softening point can be measured by a ring and ball method, a penetration method, or the like method.

Concrete examples of an appropriate resin contained in the toner-receiving resin layer as the light-transmitting resin are a thermoplastic resin such as a polyester resin, an epoxy resin, an acrylic resin including a styreneacrylic copolymer and a polyurethane resin. These resins may be either of solution type or of dispersion type. A solution resin signifies that the resin can be dissolved in solvents, for example, water; alcohols such as methanol and ethanol; ketones such as acetone and methyl ethyl ketone, esters such as ethyl acetate and butyl acetate; aromatic hydrocarbons such as toluene and xylene; and the like. Moreover, a dispersion resin signifies that the resin can be dispersed in such solvents as mentioned above, and it can be prepared by suspension polymerization or emulsion polymerization.

A polyester resin formed by polymerizing a mixture of an aromatic dicarboxylic acid and a fatty dicarboxylic acid, and a fatty diol as starting materials is appropriate for the polyester resin mentioned above. Such a polyester resin has a good compatibility with an amide nonionic surfactant, and can be made to contain a given amount of the surfactant without lowering the transparency of the toner-receiving layer. Furthermore, since the polyester resin has a suitable storage elastic modulus at the softening temperature, the surface of the toner image can be easily flattened.

Of the polyester resins as mentioned above, a polyester resin having the following features A) and B) is particularly appropriate:

A) a polyester resin obtained by polymerizing a mixture of an aromatic polycarboxylic acid and a fatty polycarboxylic acid and a mixture of fatty polyols as starting materials;

B) the mixture of the polycarboxylic acids contains terephthalic acid, isophthalic acid and sebacic acid in a total amount of 50 to 100% by mole; the mixture of the fatty polyols contains neopentyl glycol, ethylene glycol and 1,4-butanediol in a total amount of 50 to 100% by mole; the molar ratio of the polycarboxylic acids to the polyols is theoretically 50:50.

Such a polyester resin has a particularly excellent compatibility with the amide nonionic surfactant, and can be made to contain a given amount of the surfactant particularly easily without lowering the transparency of the toner-receiving layer. Furthermore, the polyester resin shows no drastic decrease in the storage elastic modulus at a fixing temperature, effectively prevents a decrease the smoothness of the image surface caused by hot offset during fixing an image, and improves the lightness and chroma of the image. In order to control such a behavior of the storage elastic modulus at a fixing temperature in an appropriate range, the polyester resin is preferred to have a storage elastic modulus of $1\times10^4$ to $1\times10^7$ dyne/$cm^2$ at 160° C. When the polyester resin has a storage elastic modulus of up to $1\times10^4$ dyne/$cm^2$, a decrease in the smoothness of an image surface caused by hot offset may not be prevented. Conversely, when the polyester resin has a storage elastic modulus exceeding $1\times10^7$ dyne/$cm^2$, the sinking of fixed toner particles in the interior of the receiving layer becomes insufficient, and recesses and protrusions may remain on the image surface. A particularly appropriate storage elastic modulus is from $5\times10^4$ to $5\times10^5$ dyne/$cm^2$. The storage elastic modulus is measured with a "disposable cup", having a diameter of 25 mm and a height of 5 mm as a sample holder, using a dynamic analyzer RDA (manufactured by Rheometrics) in a temperature step mode (temperatures to be measured being raised) and a share mode (frequency: 100 rad/sec).

Amide Surfactant

The amide surfactant contained in the toner-receiving layer functions as a compatibilizing agent of the resin for the toner and the light-transmitting resin of the toner-receiving layer, enhances the compatibility of a wide range of resins, and effectively improves the image quality. When the wax-containing toner is used, the surfactant hinders the crystal growth of the wax having bled from the toner during fixing, and prevents the wax from becoming white due to crystallization of the wax, preventing the image from lowering its transparency.

The content of the amide nonionic surfactant is usually from 0.1 to 40 parts by weight, appropriately from 0.5 to 30 parts by weight, particularly appropriately from 1 to 20 parts by weight based on 100 parts by weight of the light-transmitting resin of the toner-receiving layer. When the content is too small, the compatibilizing function and the crystal growth-hindering function may lower. When the content is excessive on the contrary, the surface may become sticky, and the film may block.

The amide surfactant is-such a compound formed from a hydroxylamine and a fatty acid as a fatty acid hydroxylalkylamide or fatty acid hydroxy(polyalkylene)amide and having an acid amide structure. The amide surfactant is appropriately a fatty acid dihydroxyalkylamide. Such compounds can particularly improve the compatibilization function and the crystal growth-hindering function. The alkyl group of the fatty acid dihydroxyalkylamide is one having from 1 to 10 carbon atoms, for example, methyl, ethyl, propyl or butyl. An appropriate number of carbon atoms of the alkyl group is from 2 to 8. When the number of carbon atoms is overly large, the compatibilization function may be deteriorated. Concrete examples of the particularly appropriate fatty acid dihydroxyalkylamide are fatty acid diethanol amides. The number of carbon atoms of the alkyl group in the fatty acid portion is usually from 2 to 30, appropriately from 3 to 20, particularly appropriately from 4 to 16. When the number of carbon atoms thereof is too small or too large, the function of compatibilization and that of hindering crystal growth may be deteriorated.

Other Additives

The toner-receiving layer may be made to contain additives such as an antioxidant, inorganic particles, polymer particles and an UV absorber so long as these additives do not deteriorate the properties mentioned above such as transparency, an elastic modulus and a softening point of the toner-receiving layer. Of these additives, the UV absorber is preferred. The toner particles have recently been made fine for the purpose of obtaining a high resolution and a high transparency of the toner image. The fine toner particles cause the light resistance of the image obtained to deteriorate. However, the resistance of the image to the light source of an OHP or to the external light may be significantly improved by the use of the toner-receiving layer according to the present invention which contains an UV absorber. In general, the UV absorber is used in an amount of 0.005 to 0.100 part by weight based on 1.2 parts by weight of the resin used in the toner-receiving layer.

Thermoplastic Toner

There is no specific limitation on the toner used for forming a toner image on the image-recording transparent film of the present invention so long as the toner is a thermoplastic toner conventionally used in the field of forming an electrophotographic image. Examples of the toner are toners comprising a styrene-(meth)acrylic acid copolymer, a styrene-acrylate copolymer, a bisphenol A epoxy resin and a polyester. Although there is no specific limitation on the average particle size, a particle size of about 5 to 30 $\mu$m is preferred in view of the resolution. A useful color toner in the present invention can be obtained by the use of toners of colors such as cyan, magenta and yellow.

As explained above, the toner may also be allowed to contain wax for the purpose of preventing hot offset. Examples of the wax are ester wax, paraffin wax, polyolefin wax, and the like. Examples of the appropriate wax are ester wax, particularly ester wax represented by the general structural formulas (1), (2) and (3). The content of the wax is usually from 5 to 40 parts by weight based on 100 parts by weight of the toner resin.

General Structure (1) of Ester Wax $$[R_1COO(CH_2)_n]_aC[(CH_2)_mOCOR_2]_b$$

wherein a and b are each an integer of 0 to 4 provided that a+b=4, $R_1$ and $R_2$ are each an alkyl group having 1 to 40 carbon atoms provided that the difference of the number of carbon atoms between $R_1$ and $R_2$ is at least 10, and m and n are each an integer of 0 to 15 provided that m and n are not 0 simultaneously.

General Structure (2) of Ester Wax $$[R_1COO(CH_2)_n]_aC[(CH_2)_mOH]_b$$

wherein a and b are each an integer of 0 to 4 provided that a+b=4, $R_1$ is an alkyl group having 1 to 40 carbon atoms, and m and n are each an integer of 0 to 15 provided that m and n are not 0 simultaneously.

General Structure (3) of Ester Wax $$[R_1COO(CH_2)_n]_aCR_3[(CH_2)_mOCOR_2]_b$$

wherein a and b are each an integer of 0 to 3 provided that a+b≦3, $R_1$ and $R_2$ are each an alkyl group having 1 to 40 carbon atoms provided that the difference of the number of carbon atoms between $R_1$ and $R_2$ is at least 10, $R_3$ is an alkyl group having at least one carbon atom, and m and n are each an integer of 0 to 15%

General Structure (4) of Ester Wax $$R_1COOR_2$$

wherein $R_1$ and $R_2$ are each independently an alkyl group having 1 to 40 carbon atoms, and the number of carbon atoms in $R_1$ can be the same as or different from that in $R_2$ General Structure (5) of Ester Wax $$R_1COO(CH_2)_nOOCR_2$$

wherein $R_1$ and $R_2$ are each independently an alkyl group having 1 to 40 carbon atoms, and n is an integer of 2 to 20, and the number of carbon atoms in $R_1$ can be the same as or different from that in $R_2$.

General Structure (6) of Ester Wax $$R_1OOC(CH_2)_nCOOR_2$$

wherein $R_1$ and $R_2$ are each independently an alkyl group having 1 to 40 carbon atoms, and n is an integer of 2 to 20, and the number of carbon atoms in $R_1$ can be the same as or different from that in $R_2$.

Method for Producing an Image-Recording Transparent Film

The image-recording film of the present invention is obtained by laminating a toner-receiving layer to a transparent substrate. Although there is no specific limitation on the lamination method, the lamination may be conducted, for example, by coating the transparent substrate with a solution containing a resin, etc. used in the toner-receiving layer with a Meyer bar, and drying.

The toner-receiving layer preferably has a thickness 1 to 20 $\mu$m. When the thickness is less than 1 $\mu$m, a desired effect (smoothing the receiving layer surface after fixing the toner, and the like) cannot be sufficiently obtained. Moreover, a thickness exceeding 20 $\mu$m exerts adverse effects on the sharpness of the projected image because of the hindered light transmission.

It is appropriate to conduct pretreatment for adhesion treatment such as corona discharge treatment and primer coat treatment on the surface of the substrate to be contacted with the toner-receiving layer, and laminate the toner-receiving layer onto the substrate. For example, a resin containing a chlorine atoms-containing polymer such as a polyvinylidene chloride or chlorinated polypropylene is applied as a primer. The primer layer usually has a thickness of 0.05 to 3 $\mu$m.

Method for Producing an Image-Recorded Film

In order to form an image which is sharp and excellent in transparency when the image is projected on an OHP, on an image-recording transparent film, an image is first formed on the image-recording transparent film by electrophotography. The image may naturally be a color image or black and white image. The image recording transparent film supporting the toner image is passed through a hot pressing roller for fixing, whereby the toner particles of the image are embedded in the toner-receiving layer.

In the heat pressing step, the toner-receiving layer is softened or melted. It is preferred that the resin of the toner-receiving layer have a softening point lower than that of the toner used for forming an image, and consequently the toner-receiving layer soften to a higher degree than the toner melts or softens. As a result, the toner Particles pressed by the roller are effectively embedded in the interior of the receiving layer, and the spaces among the individual toner particles are filled with the softened toner-receiving layer, whereby the image surface is effectively flattened. The transmitted light is thus prevented from scattering, and the projected image shows improved transparency, and improved lightness and chroma.

The hot pressing roller preferably has a temperature exceeding the softening point of the toner-receiving layer. When the hot pressing roller has a temperature lower than the softening point of the receiving layer, the toner particles are not embedded in the toner-receiving layer even when the toner particles are pressed by the roller, and the image surface is not sufficiently smoothed.

EXAMPLES

The present invention will be explained in more detail with reference to examples, but the present invention is not restricted thereto. In addition, "parts" herein is always based on weight.

Example 1

TABLE 1

| | Parts by Weight |
|---|---|
| Polyester resin (trade name of Eitel UE3250, manufactured by Unitika Ltd. | 20.00 |
| N,N-bis (e-hydroxymethyl)-N-(3'-dodecyloxy-2'-hydroxypropyl)methyl-ammonium methylsulfate (trade name of Cyastat 609, manufactured by American Cyanamid Co.) | 0.10 |
| Polystearyl Methacrylate/hexanediol diacrylate beads (manufactured by 3M) | 0.08 |
| Fatty acid diethanol amide (trade name of Dianol 300, manufactured by Daiichi Kogyo Seiyaku K.K.) | 4.00 |
| Toluene | 40.00 |
| Methyl ethyl ketone | 40.00 |

One surface of a polyethylene terephthalate film 125 $\mu$m thick having been coated with a polyvinylidene chloride in advance was coated with the above resin for forming a toner-receiving layer using a Meyer bar to form the resin layer in a dried amount of 3.4 g/m$^2$. The coated solution was held at 80° C. for 2 minutes to be dried and form an image-receiving layer. The polyester resin having been used had a storage elastic modulus (G') of $1\times10^6$ dyne/cm$^2$ at a frequency (W) of 100 rad/sec at 160° C.

A color image was formed on the surface of the imag-ereceiving layer of the image-recording transparent film thus obtained using an electrophotographic imaging apparatus (CLC 350, manufactured by Canon Inc.). The lightness (L*) and the chroma (C*) were measured using a color analyzer (TC-180OMKII, manufactured by Tokyo Denshoku K.K.). Moreover, the transmitted light density of the imaged film thus obtained was measured using a Macbeth optical densitometer (TR-924, manufactured by Macbeth.) Table 2 shows the results.

Comparative Example 1

An imaged film was prepared in the same manner as in Example 1 except for not using the fatty acid diethanol amide. Table 2 shows the results.

TABLE 2

| | Color | Transparent value | L* | C* |
|---|---|---|---|---|
| Example 1 | Yellow | 0.93 | 84.18 | 66.57 |
| | Magenta | 0.54 | 61.55 | 29.66 |
| | Cyan | 0.85 | 63.89 | 45.07 |
| Comp. Ex. 1 | Yellow | 0.91 | 81.42 | 63.54 |
| | Magenta | 0.54 | 59.15 | 28.29 |
| | Cyan | 0.86 | 62.26 | 44.64 |

It is seen from the results in Table 2 that a color image having excellent lightness and chroma is obtained.

Example 2

TABLE 3

| | Parts by weight |
|---|---|
| Polyester resin (trade name of Eitel UE3250, manufactured by Unitika Ltd. | 20.00 |
| N,N-bis (e-hydroxymethyl)-N-(3'-dodecyloxy-2'-hydroxypropyl)methyl-ammonium methylsulfate (trade name of Cyastat 609, manufactured by American Cyanamid Co.) | 0.10 |
| Polystearyl Methacrylate/hexanediol diacrylate beads (manufactured by 3M) | 0.08 |
| Fatty acid diethanol amide (trade name of Dianol 300, manufactured by Daiichi Kogyo Seiyaku K.K.) | 2.00 |
| Toluene | 40.00 |
| Methyl ethyl ketone | 40.00 |

An imaged film was prepared in the same manner as in Example 1 except for using a solution having a composition shown in Table 3. A yellow image was formed by using an electrophotographic system printer (not using silicone oil) and an ester wax-containing toner, and evaluated. The toner image thus obtained showed no offset, and it was a clear transparent image.

Comparative Example 2

An imaged film was prepared in the same manner as in Example 2 except for not using the fatty acid diethanol amide and coating with the resin in a dried amount of 6.1 g/m$^2$ , and evaluated.

TABLE 4

| | Color | Transparent value | L* | C* |
|---|---|---|---|---|
| Example 2 | Yellow | 1.21 | 72.50 | 82.63 |
| Comp. Ex. 2 | Yellow | 1.19 | 70.17 | 79.22 |

It is seen from the results in Table 4 that a yellow image having excellent lightness and chroma is obtained.

Comparative Example 3

An imaged film was prepared in the same manner as in Example 2 except for using a resin (trade name of Atlac 382E, manufactured by Reichhold Chemical) having a sharply melting property as the polyester resin, and evaluated. However, the film stuck to the fuser roller, and showed offset. The polyester resin having been used had a storage elastic modulus (G') of $8\times10^2$ dyne/cm$^2$ at a frequency (W) of 100 rad/sec at 160° C.

Example 3

TABLE 5

| | Parts by weight |
|---|---|
| Polyester resin (trade name of Nichigo Polyester WR-905, manufactured by Nihon Gosei Kagaku K.K. | 50.00 |
| Polymethyl methacrylate beads (manufactured by 3M) | 0.05 |
| Fatty acid diethanol amide (trade name of Dianol 300, manufactured by Daiichi Kogyo Seiyaku K.K.) | 1.00 |
| Pure water | 50.00 |

One surface of an OHP film (TY-731, manufactured by Sumitomo 3M Ltd.) was coated with a solution of the composition shown in Table 5 in a dried amount of 1.8 g/$m^2$ using a Meyer bar. The coated solution was held at 100° C. for 3 minutes to be dried and form an image-receiving layer. A color image was formed on the surface of the image-receiving layer of the image-recording transparent film thus obtained using an electrophotographic imaging apparatus (CLC 350, manufactured by Canon Inc.), and evaluated. The color transmission of the imaged film thus obtained was measured using a haze meter (TC-HIII, manufactured by Tokyo Denshoku K.K.). The color transmission was obtained from the following formula.

Color transmission={(attenuation caused by absorption)+(attenuation caused by scattering)}/(attenuation caused by absorption)

A color transmission of 1 denotes a state where no attenuation caused by scattering occurs, and the value is the lowest limit one.
Table 6 shows the results.

Comparative Example 4

An imaged film was prepared in the same manner as in Example 3 except for not using the fatty acid diethanolamide, and evaluated. Table 6 shows the results.

TABLE 6

| | Color | Transparent value | Color transmission |
|---|---|---|---|
| Example 3 | Yellow | 0.87 | 2.56 |
| | | .028 | 1.82 |
| | Magenta | 0.65 | 1.39 |
| | | 0.25 | 1.38 |
| | Cyan | 0.93 | 1.41 |
| | | 0.35 | 1.47 |
| Comp. Ex. 4 | Yellow | 0.90 | 4.07 |
| | | 0.30 | 2.05 |
| | Magenta | 0.62 | 1.39 |
| | | 0.25 | 1.56 |
| | Cyan | 0.94 | 1.53 |
| | | 0.35 | 1.60 |

It is seen from the results in Table 6 that a color image excellent in color transparency is obtained.

Example 4

TABLE 7

| | Parts by weight |
|---|---|
| Polyester resin (trade name of Eitel UE3250, manufactured by Unitika Ltd. | 20.00 |
| N,N-bis (e-hydroxymethyl)-N-(3'-dodecyloxy-2'-hydroxypropyl)methyl-ammonium methylsulfate (trade name of Cyastat 609, manufactured by American Cyanamid Co.) | 0.10 |
| Polystearyl Methacrylate/hexanediol diacrylate beads (manufactured by 3M) | 0.08 |
| Fatty acid diethanol amide (trade name of Dianol 300, manufactured by Daiichi Kogyo Seiyaku K.K.) | 4.00 |
| Toluene | 40.00 |
| Methyl ethyl ketone | 40.00 |

The two surfaces of a polyethylene terephthalate film 125 μm thick having been coated with a polyvinylidene chloride in advance was coated with a solution having the composition shown in Table 7 using a Meyer bar in a dried amount of 1.8 g/$m^2$. The coated solution was held at 80° C. for 3 minutes to be dried and form an image-receiving layer. A color image was formed on the, surface of the image-receiving layer of the image-recording transparent film thus obtained using an electrophotographic imaging apparatus (CLJ5, manufactured by Hewlett Packard), and evaluated. Table 10 shows the results.

Example 5

TABLE 8

| | Parts by weight |
|---|---|
| Polyester resin (trade name of Eitel UE3250, manufactured by Unitika Ltd. | 20.00 |
| N,N-bis (e-hydroxylmethyl)-N-(3'-dodecyloxy-2'-hydroxypropyl)methyl-ammonium methylsulfate (trade name of Cyastat 609, manufactured by American Cyanamid Co.) | 0.10 |
| Polystearyl Methacrylate/hexanediol diacrylate beads (manufactured by 3M) | 0.10 |
| Fatty acid diethanol amide (trade name of Dianol 300, manufactured by Daiichi Kogyo Seiyaku K.K.) | 2.00 |
| Toluene | 40.00 |
| Methyl ethyl ketone | 40.00 |

An imaged film was prepared in the same manner as in Example 4 except for using a solution having the composition shown in Table 8, and a color image was formed and evaluated. Table 9 shows the results.

Comparative Example 5

An imaged film was prepared in the same manner as in Example 4 except for not using the fatty acid diethanol amide, and evaluated. Table 9 shows the results.

TABLE 9

| | Color | Transparent value | Color transmission |
|---|---|---|---|
| Example 3 | Yellow | 1.76 | 2.13 |
| | | 0.40 | 3.14 |
| | Magenta | 0.98 | 1.21 |
| | | 0.16 | 1.80 |
| | Cyan | 1.19 | 1.30 |
| | | 0.22 | 2.03 |
| Comp. Ex. 4 | Yellow | 1.75 | 2.24 |
| | | 0.37 | 2.66 |
| | Magenta | 0.97 | 1.23 |
| | | 0.15 | 1.68 |
| | Cyan | 1.26 | 1.87 |
| | | 0.19 | 1.87 |
| Comp. Ex. 5 | Yellow | 0.90 | 2.34 |

TABLE 9-continued

| Color | Transparent value | Color transmission |
|---|---|---|
| | 0.30 | 4.02 |
| Magenta | 0.62 | 1.29 |
| | 0.25 | 1.29 |
| Cyan | 0.93 | 1.36 |
| | 0.35 | 2.49 |

It is seen from the results in Table 9 that a color image excellent in color transparency is obtained.

What is claimed:

1. An image-recording transparent film comprising a transparent substrate and a toner-receiving layer provided on at least one major surface of the substrate, the toner-receiving layer comprising a light-transmitting resin having a softening point of 90 to 180° C., and from 0.1 to 40 parts by weight of a fatty acid dihydroxyalkylamide nonionic surfactant based on 100 parts by weight of the light-transmitting resin wherein the surfactant is in a compatible state with the light-transmitting resin, and wherein the light transmitting resin is a polyester resin obtained by polymerizing a mixture of an aromatic polycarboxylic acid, a fatty polycarboxylic acid and a mixture of fatty polyols.

2. The image-recording transparent film of claim 1, wherein the polycarboxylic acid further comprises a mixture of terephthalic acid, isophthalic acid and sebacic acid in a total amount of 50 to 100% by mole.

3. The image-recording transparent film of claim 1, wherein the mixture of fatty polyols further comprises neopentyl glycol, ethylene glycol and 1,4-butanediol in a total amount of 50 to 100% by mole.

* * * * *

UNITED STATES PATENT AND TRADEMARK OFFICE

CERTIFICATE OF CORRECTION

PATENT NO. : 6,455,135 B1
DATED : September 24, 2002
INVENTOR(S) : Kamiyama, Koji It is certified that error appears in the above-identified patent and that said Letters Patent is hereby corrected as shown below:

Column 3,
Line 40, "used in the 2S field" should read -- used in the field --

Signed and Sealed this

Twenty-ninth Day of April, 2003

JAMES E. ROGAN
*Director of the United States Patent and Trademark Office*

UNITED STATES PATENT AND TRADEMARK OFFICE

CERTIFICATE OF CORRECTION

PATENT NO. : 6,455,135 B1
DATED : September 24, 2002
INVENTOR(S) : Kamiyama, Koji It is certified that error appears in the above-identified patent and that said Letters Patent is hereby corrected as shown below:

Column 1,
Lines 33-34, delete "protrusions on the toner image surface, the amount of the transmitted light in the toner image portion is"

Signed and Sealed this

Twenty-sixth Day of August, 2003

JAMES E. ROGAN
*Director of the United States Patent and Trademark Office*